No. 832,348. PATENTED OCT. 2, 1906.
L. H. THOMAS.
NOSE DEVICE FOR HOGS.
APPLICATION FILED MAR. 29, 1906.

WITNESSES
William Whaley
Carrie R. Ivy

INVENTOR
Lewis H. Thomas
By Cyrus Kehr
Attorney

UNITED STATES PATENT OFFICE.

LEWIS H. THOMAS, OF THOMASVILLE, ILLINOIS.

NOSE DEVICE FOR HOGS.

No. 832,348.  Specification of Letters Patent.  Patented Oct. 2, 1906.

Application filed March 29, 1906. Serial No. 308,630.

*To all whom it may concern:*

Be it known that I, LEWIS H. THOMAS, a citizen of the United States, residing at Thomasville, in the county of Montgomery and State of Illinois, have invented a new and useful Improvement in Nose Devices for Hogs, of which the following is a specification, reference being had to the accompanying drawings.

My improvement relates particularly to devices secured to the noses of hogs for the purpose of preventing the hogs from rooting, going through hedges, and going through wire fences.

The object of the invention is to provide such a device which shall be simple in form and efficient in action.

Figure 1:
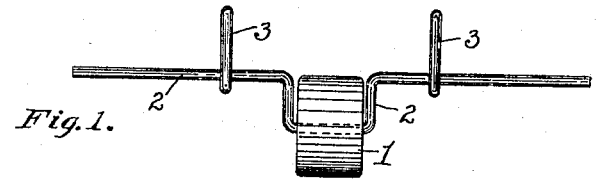
Figure 2:
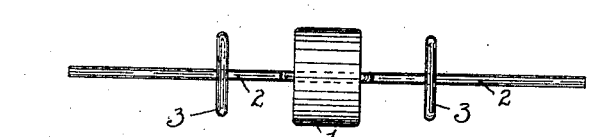
Figure 3:
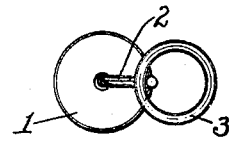
Figure 4:
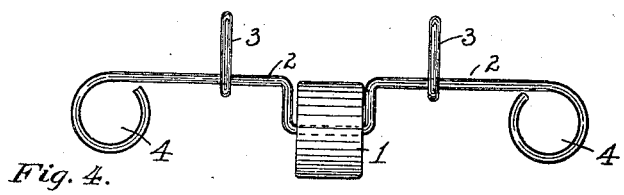
Figure 5:
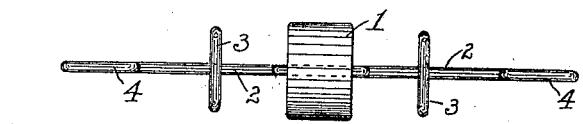
Figure 6:
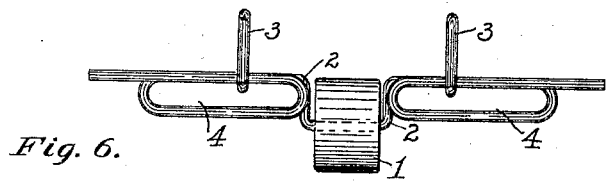
Figure 7:
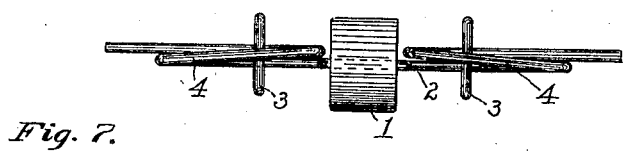
Figure 8:
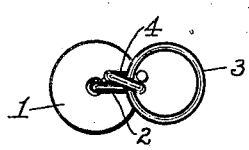

In the accompanying drawings, Figures 1 and 2 are respectively a plan and a front view of a device embodying my improvement. Fig. 3 is an end elevation of the device as shown in Fig. 2. Figs. 4 and 5 are respectively a plan and a front view of another form of the device. Figs. 6 and 7 are respectively a plan and a front view of a third form of the device. Fig. 8 is an end view of the device as shown in Fig. 7.

Referring first to Figs. 1 and 2 of the drawings, 1 is a roller of any desired material or form. 2 is a bar or wire extending through said roller and having its ends approximately equidistant from the roller. Said bar or wire is preferably offset or bent laterally at the middle, so that the axis of the roller will be forward of the axis of the main portion of said bar. This permits said bar to rest nearer the nose of the hog and also prevents the roller from moving endwise on said bar and limits the endwise movement of the bar in the rings to be next described. A ring 3 surrounds each side of the roller 1. The device is secured to the nose of a hog by extending each such ring through a portion of said nose. Said rings are preferably separated from each other sufficiently to permit the bar 2 to slide endwise to a limited extent. Said bar is preferably long enough to permit its ends to project sidewise beyond the nose of the hog to any desired extent, so as to be in position to be engaged by the stems or branches of a hedge when a hog tries to push through such hedge and so as to be engaged by the wires of a wire fence when the hog tries to push through such fence. When the animal tries to root, said roller bears upon the ground and against the end of the nose and turns and through the bars 2 pulls on the rings 3. The relatively long straight portions of the bar 2 at each side of the roller permit the placing of the rings 3 at varying distances from each other, as may be required by the form or size of the nose of the hog to which the device is to be applied.

In Figs. 4 and 5 each end of the wire 2 is turned upon itself to form an eye 4, a portion of the wire being left straight between each such eye and the roller 1 and extending slidably through the rings 3.

In Figs. 6, 7, and 8 the wire at each side of the roller is folded closely upon itself, so as to form an elongated eye 4. To form said eyes, the wire is preferably formed into spirals, the free ends of the wire projecting beyond the eyes in line with each other. The rings 3 extend through said eyes and through a portion of the nose of the hog. This, it will be seen, permits the endwise adjustment of the wire 2 and roller 1 and also permits the placing of the rings 3 at different distances from each other.

I claim as my invention—

1. A device to be applied to the nose of a hog, said device consisting of a roller, a horizontal bar extending through said roller, and a ring surrounding said bar at each side of said roller, substantially as described.

2. A device to be applied to the nose of a hog, said device consisting of a roller, a horizontal bar extending through said roller and bent laterally adjacent said roller, and a ring surrounding said bar at each side of said roller, substantially as described.

3. A device to be applied to the nose of a hog, said device consisting of a roller, a horizontal bar extending through said roller and having an eye at each side of said roller, and a ring engaging said bar at each side of said roller, substantially as described.

4. A device to be applied to the nose of a hog, said device consisting of a roller, a horizontal bar extending through said roller and bent laterally adjacent said roller and having an eye at each side of said roller, and a ring engaging said bar at each side of said roller, substantially as described.

5. A device to be applied to the nose of a hog, said device consisting of a roller, a horizontal bar extending through said roller and having an eye at each side of said roller, and a ring extending through each of said eyes, substantially as described.

6. A device to be applied to the nose of a hog, said device consisting of a roller, a horizontal bar extending through said roller and bent laterally adjacent said roller and having an eye at each side of said roller, and a ring
5 extending through each of said eyes, substantially as described.

In testimony whereof I have signed my name, in presence of two witnesses, this 24th day of March, in the year 1906.

LEWIS H. THOMAS.

Witnesses:
SAMUEL J. STOUT,
Z. D. SMITH.